Jan. 18, 1927.
M. E. CRANDALL
1,614,830
VALVE ACTUATING MECHANISM
Filed May 6, 1924   2 Sheets-Sheet 1
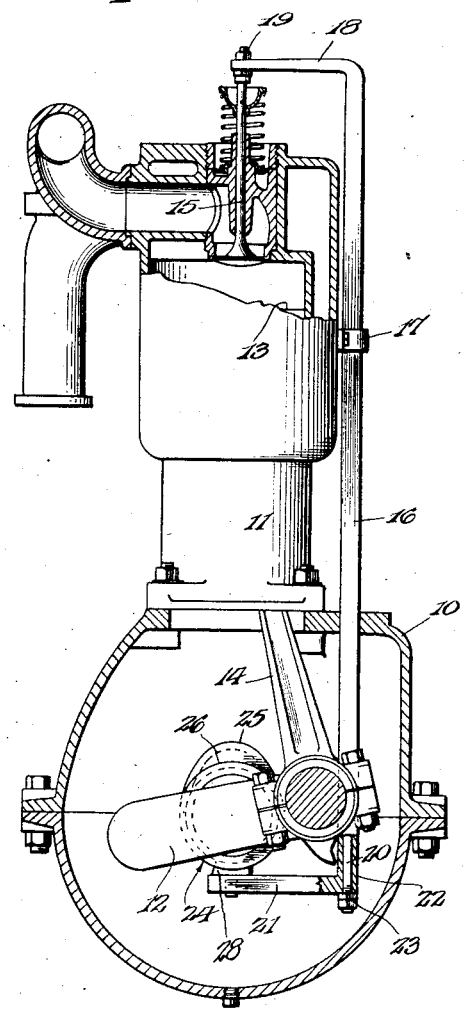
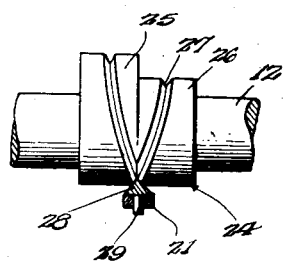
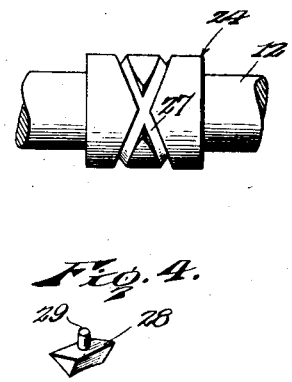
Inventor
M. E. Crandall.
By
Lacey & Lacey, Attorneys Jan. 18, 1927.
M. E. CRANDALL
1,614,830
VALVE ACTUATING MECHANISM
Filed May 6, 1924     2 Sheets-Sheet 2
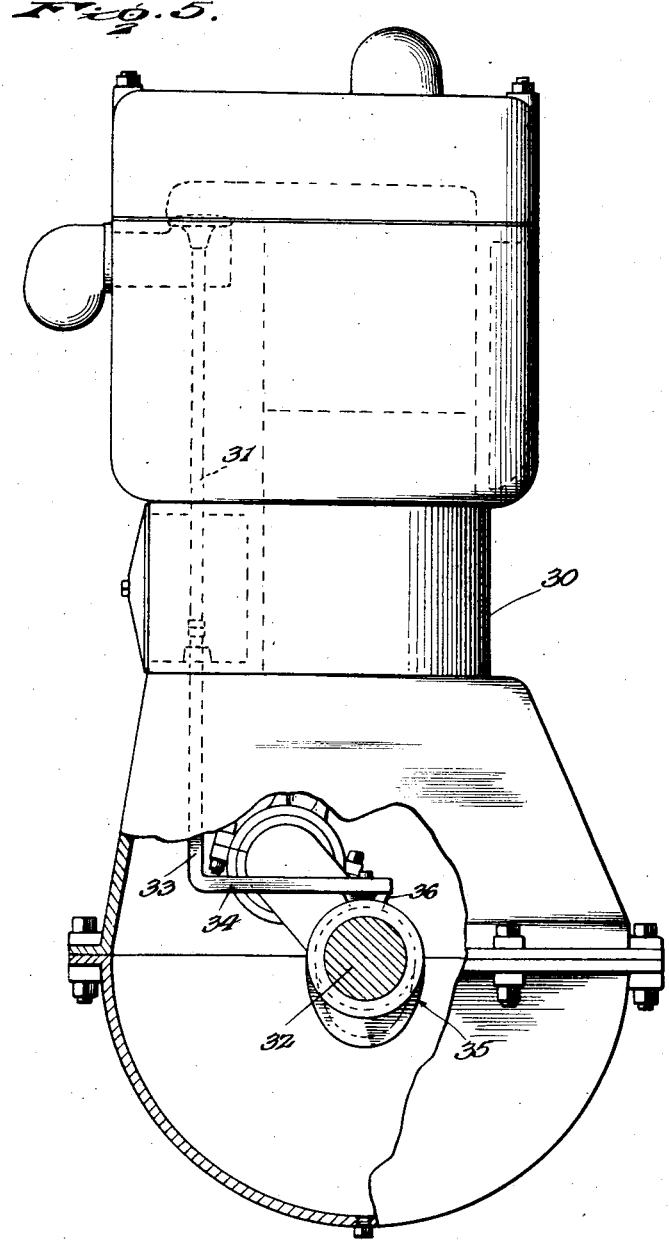

Patented Jan. 18, 1927.

1,614,830

UNITED STATES PATENT OFFICE.

MAX E. CRANDALL, OF KINGFISHER, OKLAHOMA.

VALVE-ACTUATING MECHANISM.

Application filed May 6, 1924. Serial No. 711,444.

This invention relates to an improved valve actuating mechanism for internal combustion engines and seeks, among other objects, to provide a mechanism eliminating the use of the customary timing gears and cam shaft while, at the same time, the engine valves will be operated in proper synchronism with the engine pistons.

The invention seeks, as a further object, to provide a mechanism wherein the valves will be operated directly by the engine crank shaft.

And the invention seeks, as a still further object, to provide a novel cam and associated structure for effecting the intermittent opening of the valves.

Other and incidental objects will appear hereinafter.

Figure 1 is a view partly in elevation and partly in section and showing a conventional engine equipped with my improved valve mechanism.

Figure 2 is a side elevation of the cam employed and showing the cam shoe in section.

Figure 3 is a bottom plan view of the cam.

Figure 4 is a detail perspective view of the cam shoe, and

Figure 5 is an elevation partly broken away and showing a conventional engine equipped with a slight modification of the invention.

Referring now more particularly to the drawings, I have illustrated my improved valve in connection with a conventional engine embodying a crank case 10 upon which is mounted a cylinder 11. Journaled upon the crank case is a crank shaft 12 and reciprocable in the cylinder is a piston 13 coupled with the crank shaft by a connecting rod 14. One of the valves of the engine is indicated at 15, the valve being mounted in the cylinder head. All of this structure is in accordance with standard practice and need not, therefore, be taken up in further detail.

Coming now more particularly to the subject of the present invention, I employ a valve actuating rod 16 which is slidably received through the wall of the crank case 10 and, if desired, a guide 17 may be provided for the upper end portion of the rod. However, it is necessary that the rod be permitted to oscillate about its longitudinal axis and formed on the upper end of the rod is an arm 18 extending over the valve 15 and equipped at its free end with an adjustable stud 19 to coact with the valve stem. Formed on the lower end of the rod is a reduced stem 20 upon which is mounted an arm 21 provided at its inner end with a sleeve 22 removably fitting over the stem and screwed upon the stem are nuts 23 securing the arm in position extending beneath the crank shaft. Thus, by detaching the arm, the valve rod may be removed. Integrally formed on or otherwise fixed to the crank shaft 12 is a stepped cam 24 having an eccentric portion 25 and a concentric cylindrical portion 26, and formed in the cam is a sinuous groove 27. As shown in detail in Figures 2 and 3 of the drawings, the groove 27 encircles the portions 25 and 26 of the cam and crosses itself at the lower side of said cam or that side of the cam opposite the eccentric portion 25, so that the groove is thus continuous. In the present instance, I have shown the groove as substantially V-shaped in cross section and mounted upon the arm 21 of the rod 16 to fit in said groove is a cam shoe 28. The shoe is V-shaped in cross section to conform to the groove 27 and formed on the shoe is a medially disposed stud 29 rotatably received by an opening in the free end of the arm. Thus, the shoe may oscillate about the axis of said stud and, preferably, the shoe will be of a material softer than the material of the cam so that the major portion of the wear will occur on the shoe, since the shoe may be readily renewed. Accordingly, as will be seen, as the crank shaft 12 is revolved, the shoe will follow the groove 27, first in the portion thereof encircling the eccentric portion 25 of the cam and then in the portion of the groove encircling the concentric portion 26 of the cam, the shoe turning on the arm 21 and the rod 16 being swung slightly about its longitudinal axis as the shoe traverses the distance from one portion of the cam to the other. Thus, at alternate revolutions of the crank shaft 12, the eccentric portion 25 of the cam will coact with the shoe for shifting the rod 16 downwardly and opening the valve 15 while at intervening revolutions of the crank shaft, the shoe will travel in the portion of the groove 27 encircling the portion 26 of the cam when the valve will remain closed. Intermittent opening of the valve synchronized with the movement of the engine piston is thus effected.

In Figure 5 of the drawings, I have illustrated a slight modification of the invention as adapted to a motor of the L-type. Such a motor is conventionally illustrated at 30. One of the valves of the motor is shown in dotted lines at 31, while the crank shaft is illustrated at 32. In accordance with this latter embodiment of the invention, I provide a valve actuating rod 33 which is slidably and rotatably mounted upon the crank case to coact with the lower end of the stem of the valve 31 and extending from the rod at its lower end is an arm 34 projecting over the crank shaft 32. Integrally formed on or otherwise secured to said shaft is a cam 35 identical with the cam 24 and rotatably mounted on the arm 34 to travel in the groove of said cam is a shoe 36 identical with the shoe 28. Thus, as will be understood in view of the description which has preceded, the valve will be intermittently lifted or opened as the crank shaft revolves.

Having thus described the invention, what I claim is:

In an internal combustion engine, the combination of a cylinder, a valve therefor, a crank shaft, a cam on the crank shaft having a portion concentric thereto and a portion projecting radially therefrom, said cam having its peripheral face formed with an endless V-shaped groove having portions extending about the said portions of the cam and joined by crossing portions, a slidably and rotatably mounted valve rod having its lower end reduced to provide a stem and an abutment shoulder at the upper end of the stem, the lower end portion of the stem being threaded, an arm provided at one end with a sleeve fitted upon said stem, a securing nut upon the threaded lower end portions of said stem to clamp the sleeve between the nut and the shoulder at the upper end of the stem, and an elongated shoe snugly fitting the V-shaped cam groove and having a stud rotatably mounted in the free end of the said arm.

In testimony whereof I affix my signature.

MAX E. CRANDALL. [L. S.]